United States Patent [19]

Chi

[11] Patent Number: 4,477,297
[45] Date of Patent: Oct. 16, 1984

[54] MANUFACTURE OF GEL FREE NITROCELLULOSE LACQUERS

[75] Inventor: Minn-Shong Chi, Cumberland, Md.

[73] Assignee: Hercules Incorporated, Wilmington, Del.

[21] Appl. No.: 470,845

[22] Filed: Feb. 28, 1983

[51] Int. Cl.$^3$ .............................................. C06B 45/10
[52] U.S. Cl. ................................ 149/109.6; 149/19.4; 149/19.8; 149/19.92; 149/98; 149/100
[58] Field of Search .................... 149/19.4, 19.8, 19.92, 149/98, 100, 109.6

[56] References Cited

U.S. PATENT DOCUMENTS

| | | | |
|---|---|---|---|
| 3,682,726 | 8/1972 | Stiefel | 149/100 |
| 3,702,272 | 11/1972 | McDonnell et al. | 149/19.8 |
| 3,873,517 | 3/1975 | Liggett et al. | 149/100 |
| 3,907,619 | 9/1975 | Elrick | 149/95 |
| 3,956,890 | 5/1976 | Davis | 149/19.4 |
| 4,018,637 | 4/1977 | Kimmel et al. | 149/100 |
| 4,052,943 | 10/1977 | Elrick | 149/19.4 |
| 4,234,364 | 11/1980 | Robinson | 149/19.4 |
| 4,243,442 | 1/1981 | Armantrout | 149/19.92 |
| 4,284,442 | 8/1981 | Voigt | 149/19.4 |
| 4,339,288 | 7/1982 | Camp | 149/35 |

FOREIGN PATENT DOCUMENTS

| | | | |
|---|---|---|---|
| 757442 | 3/1971 | Belgium | 149/109.6 |
| 2010240 | 6/1979 | United Kingdom | 149/19.8 |

Primary Examiner—Edward A. Miller
Attorney, Agent, or Firm—Edmund C. Ross, Jr.

[57] ABSTRACT

Manufacturing gel free nitrocellulose lacquers in shorter time by less hazardous methods is disclosed. A low boiling solvent, miscible with polyol polymer and nitrate ester, is used during the manufacture to provide a lacquer premix comprising the polyol polymer and nitrocellulose. The premix may be a clear solution or an emulsion. Explosive nitrate esters are added to the lacquer premix and the resulting admixture sparged to reduce the water (if present) and low boiling solvent each to below about 0.02% by weight and form the gel free nitrocellulose lacquer.

4 Claims, No Drawings

MANUFACTURE OF GEL FREE NITROCELLULOSE LACQUERS

BACKGROUND OF THE INVENTION

1. Field of Use

This invention relates to making crosslinkable lacquers for rocket motor propellants, the lacquers containing nitrocellulose, one or more explosive nitrate ester plasticizers and a propellant binder prepolymer such as polyglycol adipate. This invention, more particularly, relates to making these nitrocellulose lacquers gel free in shorter times by less hazardous methods.

2. Prior Art

Nitrocellulose lacquers heretofore have been made by a process that includes dissolving the nitrocellulose in a mixture of nitroglycerin and butanetriol trinitrate. The mixture of these latter nitrate esters is separately prepared from mixtures of the individual nitrate esters with 2-nitrodiphenylamine. There are hazards, however, associated with handling of the 99/1 nitroglycerin and 2-nitrodiphenylamine mixture.

Another possible route in manufacturing of nitrocellulose is to start with a solution of nitroglycerin and polyglycol adipate. Butanetriol trinitrate, dissolved in methylene chloride, is then added to this solution. The nitrocellulose is added to this admixture and the resulting combination of ingredients sparged. However, dissolution of the nitrocellulose has proven to be very difficult using this procedure. In one case some undissolved nitrocellulose remained even after sparging for several weeks at 140° F. Reduced manufacturing time is possible by adding acetone during processing of the lacquer, but this addition introduces hazards due to the flammable vapors of acetone.

OBJECTS OF THE INVENTION

It is an object of this invention to provide methods of manufacturing gel free nitrocellulose lacquers suitable for crosslinking in propellants.

It is an object of this invention to accomplish this manufacture in an expedient fashion without unnecessary hazards.

These and other objects of this invention have been achieved; they are more fully characterized in the following disclosure which describes present techniques for their accomplishment.

BRIEF SUMMARY OF THE INVENTION

Nitrocellulose is first dispersed in polyol polymer in the presence of a low boiling non-flammable solvent to form a lacquer premix in practice of this invention. If the lacquer premix (containing about 50% by weight CH$_2$Cl$_2$) has 5% or less by weight of water-wet nitrocellulose (30% water by weight), or if it is free of water, then the lacquer premix can be a clear solution. If the lacquer premix has above 5% (by weight) of such water-wet nitrocellulose, then it may be an emulsion. Each explosive nitrate ester plasticizer, appropriately diluted with a low boiling non-flammable solvent, to be included in the lacquer is then added to the clear solution or emulsion of the lacquer premix. The resulting admixture is then subjected to sparging with an inert gas to reduce the content of the water, if any, and of the solvent each to below about 0.02% by weight of the final nitrocellulose lacquer. The final nitrocellulose lacquer is gel free.

The aforesaid solvent must be of special character for practice of this invention. The solvent must be low boiling, miscible with the polyol polymer, miscible with the nitrate ester plasticizers, and have non-flammable vapors.

DETAILED DESCRIPTION OF PREFERRED EMBODIMENTS OF THE INVENTION

In accordance with this invention an expedient, reduced hazard method is provided for manufacture of a gel free nitrocellulose lacquer. The method comprises: (a) forming a lacquer premix by dispersing nitrocellulose in a polyol polymer in the presence of a liquid, low boiling solvent that (i) has non-flammable vapors, (ii) is miscible with the polyol polymer and nitrate esters and (iii) is low boiling, the solvent being included in amounts sufficient to reduce the viscosity of the polyol polymer; (b) adding to the lacquer premix each explosive nitrate ester plasticizer, which may be appropriately diluted with the selected low boiling solvent, to be included in the lacquer; (c) sparging the results of step (b), above, with an inert gas for a time sufficient to reduce the content of the solvent and of the water, if any, respectively to below 0.02% by weight each and form the gel free nitrocellulose lacquer.

In forming the lacquer premixes of this invention, the order in which the nitrocellulose, solvent, and polyol polymer are added together can vary. A first embodiment of this invention includes forming the lacquer premix by adding the solvent to a mixture of the polyol polymer and nitrocellulose. This embodiment is particularly adapted to use of water-free nitrocellulose.

In a practice of this first embodiment, a mixture of water-wet nitrocellulose and a liquid hydrocarbon such as hexane can be azeotropically distilled to remove water. Then, the polyol polymer is added to the remaining mixture of nitrocellulose and liquid hydrocarbon. The liquid hydrocarbon is then removed by decanting and stripping it from the nitrocellulose and polyol polymer admixture. Then, the solvent is added to the nitrocellulose and polyol polymer to form the lacquer premix, a clear solution in such a practice of this invention.

In a second embodiment, the solvent is first added to the polyol polymer and then nitrocellulose is added thereto to form the lacquer premix.

When the water-wet nitrocellulose (30% by weight water) used in the lacquer premix (containing about 50% by weight CH$_2$Cl$_2$) is over 5% by weight, the lacquer premix is in the form of an emulsion. If the water-wet nitrocellulose (30% by weight water) content is 5% or below by weight, of the lacquer premix, or if it is free of water, the lacquer premix can be a clear solution.

The weight ratio of polyol polymer to solvent employed in forming the lacquer premix is preferably between 1:1 to 1:2. The weight ratio of nitrocellulose to liquid polyol polymer in forming the lacquer premixes is preferably between 1:6 and 1:5.

After the lacquer premix is formed, the one or more explosive nitrate ester plasticizers are added thereto in such amounts that these plasticizers together will comprise at least about 50% by weight of the final nitrocellulose lacquer.

Each explosive nitrate ester plasticizer is preferably dissolved in an aforementioned solvent before adding it to the lacquer premix. Each of these solutions of explosive nitrate ester plasticizer and the solvent preferably contains stabilizer such as 2-nitridiphenlamine for the nitrate ester thereof. The weight ratio of nitrate ester to the solvent in these stabilized solutions is not critical but is preferably between about 2:1 to 4:1, nitrate ester to solvent by weight.

The solvent is preferably a chlorinated hydrocarbon or other non-flammable hydrocarbon, examples of which include methylene chloride, and 1,2-dichloroethane, etc. Mixtures of the chlorinated compounds can be used as the solvent. The solvent has a boiling point below about 85° C. The solvent advantageously is selected to have non-flammable vapors.

The polyol polymer is any hydroxy-terminated prepolymer ordinarily used as a propellant binder prepolymer for rocket motor propellants. (The function of such propellant binder prepolymers is to crosslink with isocyanate in subsequent propellant manufacture).

The polyol polymers suitable in this invention have molecular weights (number average) between about 1000 and 8000, more preferably between about 2000 and 6000. The hydroxy functionality ranges between 2 and 5 per polyol polymer molecule.

The nitrocellulose useful in practice of this invention includes any nitrocellulose typically employed in making nitrocellulose lacquers for propellants. Thus, the nirocelluloses suitable for use in this invention have about 11 to 13.4% by weight nitrogen and approximate intrinsic viscosities which vary from 0.40 dL/gram to 1.87 dL/gram. Examples of these nitrocelluloses are set forth below in Table 1:

TABLE 1

| Nitrocellulose Type[1] | Approx. Nitrogen (Wt %) | Calculated Molecular Weight[2] | Approx. Intrinsic Viscosity dl/gr[3] | Solution[4] Viscosity (seconds) |
|---|---|---|---|---|
| RS 18-25 cps | 12.0 | 14,000 | 0.40 | 18-25 cps (12.2% soln) |
| RS ¼ sec | 12.0 | 22,000 | 0.55 | 4-5 sec (25% soln) |
| RS ½ sec | 12.0 | 33,000 | 0.72 | 3-4 sec (20% soln) |
| RS ¾ sec | 12.0 | 42,000 | 0.88 | 6-8 sec (20% soln) |
| RS 5-6 sec | 12.0 | 68,000 | 1.47 | 5-6.5 sec (12.2% soln) |
| RS 15-20 sec | 12.0 | 90,000 | 1.87 | 15-20 sec (12.2% soln) |
| Pyrocotton | 12.6 | 120,000 | 2 | 15 sec (10% soln) |
| Guncotton | 13.4 | 120,000 | 2 | 15 sec (10% soln) |
| SS ¼ sec | 11.0 | 22,000 | 0.55 | 4-5 sec (25% soln) |
| SS ½ sec | 11.0 | 33,000 | 0.72 | 3-4 sec (20% soln) |
| SS 5-6 | 11.0 | 42,000 | 1.47 | 5-6.5 sec (12.2% soln) |

[1] RS and SS type designations for nitrocellulose specifically refer to designations used by Hercules Incorporated for nitrocellulose grades sold by Hercules Incorporated. An "RS" type nitrocellulose indicates solubility of the nitrocellulose in esters such as ethyl and butyl acetates, in ketones and glycol ethers. An "SS" type nitrocellulose indicates solubility of the nitrocellulose in mixtures of alcohol and toluene. See "Nitrocellulose, Properties and Uses", Hercules Powder Company, (1955), pages 10, 11, 12.
[2] Molecular weight calculated from intrinsic viscosity values. See article entitled "Intrinsic Viscosity of Nitrocellulose, C. H. Lindsley and M. B. Frank, Industrial and Engineering Chemistry, November 1953, pp. 2491–2497.
[3] Intrinsic Viscosity determine using acetone solvent.
[4] Solution viscosity is measured by the Falling Ball Method using as the solvent a mixture comprising by weight, 20% ethyl acetate, 25% denatured ethyl alcohol and 55% toluene.

The explosive nitrate ester plasticizers useful in making the nitrocellulose lacquers of this invention include any of the explosive nitrate esters typically used in propellant manufacture. Among these nitrate esters are butanetriol trinitrate, nitroglycerin, trimethylol ethane trinitrate, ethylene glycol dinitrate, and glycerol glycol ether trinitrate. These nitrate esters act as plasticizers for the crosslinked propellants made from the nirocellulose lacquers of this invention.

Examples of stabilizers for the nitrate esters are N-methyl p-nitroaniline and 2-nitrodiphenylamine both of which are typically used as stabilizers for nitrate ester in propellant manufacture.

The temperatures used for making the lacquer premixes are preferably between about 65° F. and 75° F. during mixing of the polyol polymer, nitrocellulose and solvent. The time of this mixing is between about 8 and 16 hours. The temperatures during preparation of the final lacquer with the lacquer premix and the nitrate ester plasticizers is preferably between about 90° F. and 120° F. The time for incorporating the nitrate ester plasticizers into the lacquer premix and subsequently sparging results thereof ranges between about 18 and 48 hours.

The following examples illustrate this invention but are not meant as limiting its scope. All parts are parts by weight unless specifically noted otherwise.

EXAMPLE 1

(a) Lacquer Premix Preparation 147 g of a first polyglycol adipate[1] and 287.8 g of a second polyglycol adipate[2] were placed in a two liter resin flask equipped with a mechanical stirrer, thermometer and wide-mouth funnel. 500 g (377.4 ml) $CH_2Cl_2$ was added to a solution formed from these polyglycol adipates and the mixture was stirred until it became homogeneous (one phase). Then 65.2 g water-wet nitrocellulose (28% by weight water)[3] was added incrementally into the solution of the polyglycol adipates and methylene chloride with high-speed stirring to disperse the nitrocellulose. After the nitrocelluose addition stirring was continued slowly at room temperature until a well-dispersed emulsion was achieved, which took about 12 hours. The above well-dispersed lacquer premix emulsion was transferred to a sealed container for the next step.

[1] Available from Mobay Chem Co as PGA (E606).
[2] Available from Hooker Chem Co as PGA (S1011-35).
[3] Available from Hercules/Kenvil as NC (RS-5 sec).

(b) Lacquer Preparation 308.6 g of the lacquer premix of (a) above, 26.6 g N-methyl-p-nitro-aniline[4], 7.1 g 2-nitrodiphenylamine[5], 759.9 g nitroglycerin[6]/$CH_2Cl_2$ (30%) solution, and 409.3 g butanetriol trinitrate[7]/$CH_2Cl_2$ (30%) solution were added into the sparging desiccator, connected to a nitrogen ($N_2$) tank. The above mixture was sparged by $N_2$ for about 24 hours at 120° F. until both $CH_2Cl_2$ and water contents were each below 0.02% by weight. The resulting gel free lacquer was transferred to a polyethylene bottle which was placed in a polyethylene bag with molecular sieves to prevent the absorption of water into the lacquer. The lacquer was then stored until ready for use in a propellant mix.

[4] Available from American Cyanamid as MNA.
[5] Available from American Cyanamid as 2-NDPA.
[6] Available from Hercules/Kenvil as NG.
[7] Available from IMC Chem. Inc. (Trojan Div) as BTTN.

EXAMPLE 2

(a) Lacquer Premix Preparation 241.7 g polyethylene glycol[1] and 265.5 g (194 ml) $CH_2Cl_2$ were placed in a resin flask equipped with a mechanical stirrer, thermometer and wide-mouth funnel. The mixture was stirred until the PEG dissolved in the $CH_2Cl_2$. Then 22.4 g water-wet nitrocellulose (25% by weight water)[2] was added slowly into the polyethylene glycol/$CH_2Cl_2$ solution with high-speed stirring to disperse the nitrocellulose. After the completion of nitrocellulose addition, the mixture was stirred slowly at room temperature for about 8 hours. A clear lacquer premix solution was achieved. The lacquer premix was transferred to a sealed container for the next step.

[1] Available from DOW Chem Corp. as PEG (DOW 4500).
[2] Available from Hercules as NC (RS-5 sec).

(b) Lacquer Preparation 44.3 g lacquer premix (polyethylene glycol/nitrocellulose/$CH_2Cl_2$ solution) and 104 g nitroglycerin[3]/$CH_2Cl_2$ (25%) solution were placed in the sparging desiccator, connected to a nitrogen ($N_2$) tank. The mixture was sparged at 120° F. by nitrogen for two days until both $CH_2Cl_2$ and water contents were each below 0.02% by weight. The $CH_2Cl_2$ contents was determined by gas chromatography (GC) and water content was determined by the Karl Fischer Aquatest method. The gel free lacquer was then transferred to a PE bottle in preparation for a propellant mix.

[3] Available from Hercules as NG.

EXAMPLE 3

The mechanical properties and ballistics of a isocyanate crosslinked propellant made using nitrocellulose lacquer manufactured as in this invention are shown below. As can be seen, these properties are comparable to those of an isocyanate crosslinked propellant made using a nitrocellulose lacquer using a prior art (previous) technique.

| NC Lacquer Process Condition | Mechanical Properties, 77 F/0.74 $min^{-1}$ | | | Burning Rate, in/sec | | |
|---|---|---|---|---|---|---|
| | E(psi) | (psi) | (%) | $r_{1000}$ | $r_{2000}$ | $r_{2500}$ |
| New Method | 347 | 112 | 97 | .490 | .623 | .695 |
| Old Method | 374 | 126 | 100 | .497 | .620 | .685 |

The previous method is as follows: 531.9 g nitroglycerin/2-nitrodiphenylamine (99/1) and 286.5 g butanetriol/2-nitrodiphenyl-amine (99/1) were placed in the sparging desiccator. 20.6 g water-wet nitrocellulose (NC) (30% water) was added into the above nitrate ester mixture, connected to a nitrogen ($n_2$) tank, and sparged by $N_2$ for 3 to 5 days at 120°–140° F. until the NC was completely dissolved and water content was below 0.05%. 44.9 g of a first polyglycol adipate, 88.1 g of a second polyglycol adipate, 7.1 g 2-nitrodiphenylamine and 26.6 g N-methyl-p-nitroaniline were added into the above solution. The mixture was sparged by nitrogen for another one or two days until the water content was below 0.02% by weight. The gel free lacquer was then transferred to a polyethylene bottle in preparation for a propellant mix.

EXAMPLE 5

Azeotropic Distillation of Water-Wet Nitrocellulose (a) Method I 33.5 g water-wet NC (30% water) and 170 ml hexane were placed in a one liter resin flask equipped with a mechanical stirrer, thermometer, and azeotropic distillation head with condenser. The mixture was refluxed to remove water until 10.0 g of water was collected, which took approximately 3 hours. After all water was removed, 217.4 g of polyglycol adipate was added into the NC/hexane mixture and stirred slowly. Hexane was decanted off; the remainder of the hexane was distilled off by applying slight vacuum. After all hexane was removed, 240 g $CH_2Cl_2$ was added, and the mixture was stirred slowly for 8 hours. The above lacquer premix solution was transferred to a sealed container for the lacquer preparation.

(b) Method II 33.5 g water-wet NC (30% water) and 170 ml hexane were placed in a 500-ml resin flask equipped with a mechanical stirrer, thermometer, and azeotropic distillation head with condenser. The mixture was refluxed to remove water until 10.0 g of water was collected. The hexane was filtered off simultaneously $CH_2Cl_2$ was added. Thus, the $CH_2Cl_2$-wet NC was obtained. This $CH_2Cl_2$-wet NC was then added into the polyglyol adipate/$CH_2Cl_2$ solution with stirring. The mixture was continuely stirred for about 10 hours until it became homogeneous (one phase). The above lacquer premix solution was transferred to a sealed container for the lacquer preparation followed by the procedure described in Example 1(b).

I claim:

1. A method of manufacturing a gel free nitrocellulose lacquer suitable for crosslinking in a propellant composition, said method comprising:
   (a) forming a lacquer premix by dispersing nitrocellulose in polyol polymer in the presence of a liquid, solvent that (i) has non-flammable vapors, (ii) is miscible with said polyol polymer and nitrate ester plasticizer, and (iii) is low boiling, said solvent being included in an amount sufficient to reduce the viscosity of said polyol polymer;
   (b) adding to said lacquer premix each explosive nitrate ester plasticizer, which may be appropriately diluted with said solvent, to be included in said lacquer;
   (c) sparging the results of step (b) with an inert gas for a time sufficient to reduce the content of said solvent and water, if any, respectively, to below about 0.02% by weight and form said gel free nitrocellulose lacquer.

2. The method in accordance with claim 1, wherein the weight ratio of said polyol polymer to said solvent is between about 1:1 and 1:2.

3. The method in accordance with claim 2, wherein said solvent comprises methylene chloride.

4. The method in accordance with claim 3, wherein each said explosive nitrate ester plasticizer is added to said lacquer premix as a solution in which said methylene chloride or other chlorohydrocarbon is the solvent.

* * * * *

UNITED STATES PATENT AND TRADEMARK OFFICE
CERTIFICATE OF CORRECTION

PATENT NO. : 4,477,297
DATED : October 16, 1984
INVENTOR(S) : Minn-Shong Chi

It is certified that error appears in the above—identified patent and that said Letters Patent are hereby corrected as shown below:

Column 4, Example 1 (b) Lacquer Prep. " 308.6g "

Should read -- 306.8g --

*Signed and Sealed this*

*Twenty-fifth* Day of *June 1985*

[SEAL]

*Attest:*

DONALD J. QUIGG

*Attesting Officer*  *Acting Commissioner of Patents and Trademarks*